United States Patent Office 3,534,079
Patented Oct. 13, 1970

1

3,534,079
10-(HALOPHENYL)PHENOXARSINE COMPOUNDS
Chun-Shan Wang and Thomas W. McGee, Midland, Mich., assignors to The Dow Chemical Company, Midland, Mich., a corporation of Delaware
No Drawing. Filed Feb. 28, 1969, Ser. No. 803,466
Int. Cl. C07d 105/06
U.S. Cl. 260—440                    5 Claims

ABSTRACT OF THE DISCLOSURE 10-(halophenyl)phenoxarsines are disclosed as novel compounds useful as herbicides, insecticides, fungicides and preservatives.

SUMMARY OF THE INVENTION

The present invention is concerned with new and useful 10-(halophenyl)phenoxarsine compounds and is particularly directed to 10-(halophenyl)phenoxarsines corresponding to the formula

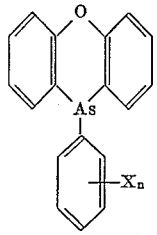

wherein X is chlorine or bromine and $n$ is an integer ranging from 1 to 5, inclusive.

The products of the present invention are normally white crystalline solids soluble in various organic solvents and of low solubility in water. The novel products are useful as herbicides, insecticides, fungicides and preservatives.

In general, the compounds of the invention are prepared by a Grignard reaction wherein a chlorophenylmagnesiumbromide, chlorophenylmagnesiumiodide or bromophenylmagnesiumiodide is refluxed with 10-chlorophenoxarsine. Ordinarily, in preparing the compounds, a Grignard reagent is first prepared by adding a small amount of halobenzene, e.g., a bromochlorobenzene, bromoiodobenzene or chloroiodobenzene, to magnesium and heating these reactants. Operable bromochlorobenzenes, bromoiodobenzenes and chloroiodobenzenes include, for example, o-bromochlorobenzene; p-bromochlorobenzene; m-bromochlorobenzene; 1-bromo-2,3-dichlorobenzene; 1-bromo-2,4-dichlorobenzene; 1 - bromo-2,5-dichlorobenzene; 1-bromo-2,6-dichlorobenzene; 3,4-dichloro-1-iodobenzene; 3,5-dichloro-1-iodobenzene; 3,6-dichloro-1-iodobenzene; 4,5-dichloro-1-iodobenzene; 4,6-dichloro-1-iodobenzene; 5,6-dichloro-1-iodobenzene; 1-bromo-2,3,4-trichlorobenzene; 1 - bromo-2,3,5 - trichlorobenzene; 1-bromo-2,3,6-trichlorobenzene; 1 - bromo-2,4,5-trichlorobenzene; 1-bromo-2,4,6-trichlorobenzene; 1-bromo-2,5,6-trichlorobenzene; 3,4,5-trichloro-1-iodobenzene; 3,4,6-trichloro-1-iodobenzene; 3,5,6-trichloro - 1-iodobenzene; 4,5,6 - trichloro - 1 - iodobenzene; 1 - bromo - 2,3, 4,5 - tetracholorobenzene; 1 - bromo - 2,3,4,6 - tetrachlorobenzene; 2,4,5,6 - tetrachloro - 1 - iodoben-

2 zene; 3,4,5,6-tetrachloro-1-iodobenzene; 1-bromo-2,3,4,5, 6-pentachlorobenzene; o-bromoiodobenzene; p-bromoiodobenzene; 2,4-dibromo-1-iodobenzene; 2,4,6-tribromo-1-iodobenzene and the like. The remainder of the halobenzene to provide a 1:1 mole ratio of magnesium:halobenzene (based on initial quantities of reactants) is added at such a rate so as to maintain the reaction mixture at a gentle reflux. After the addition is complete, the reaction mixture is refluxed, ordinarily from about four to six additional hours, until all the magnesium is consumed. The reaction of the halobenzene reactant and magnesium reactant conveniently is carried out in the presence of an inert organic solvent. Use of such a solvent is not critical, but it is preferred since it provides for better dispersion of the halobenzene and better contacting of the reactants. Representative suitable organic solvents include, for example, hydrocarbons of the benzene series such as benzene, toluene and xylene, ether and tetrahydrofuran. Of these, tetrahydrofuran preferably is employed as the organic solvent reaction medium.

10-chlorophenoxarsine dissolved in an organic solvent of the type set forth directly hereinbefore and usually the same as employed in preparing the Grignard reagent is added to the Grignard reagent. The resulting mixture is refluxed and the product solution separated as by filtering, for example, and the filtrate is concentrated or otherwise treated to recover the desired product therefrom. Ordinarily, the filtrate is concentrated and allowed to stand in a cool place to precipitate the product, after which the solids are separated and collected, e.g., on a filter or by centrifuging.

The reaction of the halophenylmagnesiumbromide or iodide Grignard reagent and the 10-chlorophenoxarsine reactant is carried out at a temperature range of from about 30° to about 130° C. and is preferably conducted at from about 50° to about 70° C. The reaction goes forward under pressures of a wide range; however, no particular advantage ordinarily results from the use of subatmospheric or superatmospheric pressures, and therefore the preparation is ordinarily carried out at atmospheric pressure.

The amounts of the Grignard reagent and 10-chlorophenoxarsine reactants to be employed are not critical, some of any of the desired products being formed when employing these in any proportions. However, the reaction consumes the reactants in the proportion of one mole of 10-chlorophenoxarsine to one mole of halophenylmagnesiumbromide or iodide. A suitable ratio of reactants is 1:1 to 1:3 (10-chlorophenoxarsine:halophenylmagnesiumbromide or iodide) and the employment of a 1:2 mole ratio of the reactants is preferred.

The reaction mixture ordinarily is refluxed in the presence of an inert liquid reaction medium in a refluxing apparatus equipped with an agitator. Ordinarily, the reactants are refluxed for a period of from about 2 to about 24 hours, and preferably, to obtain optimum yields, from about 4 to about 12 hours. The 10-(halophenyl) phenoxarsine product can be recovered from the product mass and the separated product can be employed directly for the useful purposes of the present invention. If desired, the product can be further purified by conventional procedures before being so employed. Representative purification procedures include washing with an appropriate liquid which is a solvent for impurities but not for the product, recrystallization and the like.

DESCRIPTION OF THE PREFERRED EMBODIMENTS

The following examples illustrate the present invention but are not to be construed as limiting the same.

Example 1.—10-(p-chlorophenyl)phenoxarsine

Magnesium turnings (2.43 grams; 0.1 mole) are placed into a three-necked round bottomed flask equipped with a condenser, dropping funnel and a magnetic stirrer. p-Bromochlorobenzene (19.15 grams; 0.1 mole) dissolved in 100 milliliters of substantially anhydrous tetrahydrofuran is placed in the dropping funnel. The reaction is initiated by the addition of 10 milliliters of p-bromochlorobenzene-tetrahydrofuran solution to the magnesium with heating. As soon as the reaction is started, the rest of the p-bromochlorobenzene-tetrahydrofuran solution is added at a rate so as to maintain the reaction mixture at gentle reflux. After the addition is complete, the reaction mixture is refluxed until all the magnesium is consumed.

10-chlorophenoxarsine (13.9 grams; 0.05 mole) dissolved in 50 milliliters of tetrahydrofuran is added dropwise to the resulting Grignard reagent solution and this mixture is refluxed for a period of from 4 to 12 hours. The product mass is filtered and the filtrate is evaporated to dryness by use of a rotary evaporator. The crude product is recrystallized from an acetone-ethanol mixture to give 15.2 grams (86 percent yield) of the desired 10-(p-chlorophenyl)phenoxarsine product as white crystalline needles melting at from 102°–104° C. The infrared spectrum of the crystalline solid supports the proposed structure. Elemental analysis showed: C, 61.2 percent; H, 3.30 percent; Cl, 10.1 percent; calculated for $C_{18}H_{12}AsClO$: C, 60.95 percent; H, 3.39 percent; Cl, 10.02 percent.

Example 2.—10-(o-chlorophenyl)phenoxarsine

By following the procedural steps and employing equivalent amounts of reactants as set forth in Example 1, 10-(o-chlorophenyl)phenoxarsine is obtained by reacting together o-bromochlorobenzene and magnesium and refluxing this solution with 10-chlorophenoxarsine. The crude solid is purified by three recrystallizations from an ethanol-acetone mixture. The product of reaction is a white crystalline solid melting at from 95°–97° C. The infrared spectrum of the crystalline solid supports the proposed structure. Elemental analysis shows: C, 59.6 percent; H, 3.43 percent; Cl, 10.2 percent; calculated for $C_{18}H_{12}AsClO$: C, 60.95 percent; H, 3.39 percent; Cl, 10.02 percent.

Example 3.—10-(m-chlorophenyl)phenoxarsine

By following the procedural steps and using equivalent quantities of reactants as set forth in Example 1, 10-(m-chlorophenyl)phenoxarsine is obtained by reacting together m-bromochlorobenzene and magnesium and refluxing this solution with 10-chlorophenoxarsine. The crude solid is purified by three recrystallizations from an ethanol-acetone mixture. The product of reaction is a white crystalline solid melting at from 93°–95° C. The infrared spectrum of the crystalline solid supports the proposed structure. Elemental analysis shows: C, 60.7 percent; H, 3.32 percent; Cl, 10.1 percent; calculated for $C_{18}H_{12}AsClO$: C, 60.95 percent; H, 3.39 percent; Cl, 10.02 percent.

In view of the foregoing teachings and examples, those skilled in the art will be enabled to prepare all of the products of the present invention. Other representative products are set forth in the following examples:

10-chlorophenoxarsine is reacted with 2,4-dichlorophenylmagnesiumbromide to provide 10-(2,4-dichlorophenyl)phenoxarsine having a molecular weight of 389.1.

10-chlorophenoxarsine is reacted with 2,6-dichlorophenylmagnesiumbromide to provide 10-(2,6-dichlorophenyl)phenoxarsine having a molecular weight of 389.1.

10-chlorophenoxarsine is reacted with 2,4,6-trichlorophenylmagnesiumiodide to provide 10-(2,4,6-trichlorophenyl)phenoxarsine having a molecular weight of 423.6.

10-chlorophenoxarsine is reacted with 2,4,5,6-tetrachlorophenylmagnesiumbromide to provide 10-(2,4,5,6-tetrachlorophenyl)phenoxarsine having a molecular weight of 458.0.

10-chlorophenoxarsine is reacted with 2,3,4,5,6-pentachlorophenylmagnesiumiodide to provide 10-(2,3,4,5,6-pentachlorophenyl)phenoxarsine having a molecular weight of 492.5.

10-chlorophenoxarsine is reacted with o-bromophenylmagnesiumiodide to provide 10-(o-bromophenyl)phenoxarsine having a molecular weight of 399.1.

10-chlorophenoxarsine is reacted with p-bromophenylmagnesiumiodide to provide 10-(p-bromophenyl)phenoxarsine having a molecular weight of 399.1.

10 - chlorophenoxarsine is reacted with 2,4 - dibromophenylmagnesiumiodide to provide 10 - (2,4 - dibromophenyl)phenoxarsine having a molecular weight of 478.0.

10-chlorophenoxarsine is reacted with 2,4,6-tribromophenylmagnesiumiodide to provide 10 - (2,4,6 - tribromophenyl)phenoxarsine having a molecular weight of 553.94.

The products of the present invention are useful as pesticides for the control of a wide variety of fungal, bacterial and insect pests such as *Candida pelliculosa, Trichophyton mentagrophytes,* acid fast bacterium, southern army worm and the like. They are also found to exhibit outstanding pre-emergent herbicidal activity on terrestrial plants. For any of these uses, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 100 to about 500 parts per million of one or more of the compounds. When utilized as pre-emergent herbicides, the compounds of the invention are poured on the soil in amounts which give rates of 10 pounds per acre of treated soil.

In representative operations, each of 10 - (o - chlorophenyl)phenoxarsine, 10 - (m - chlorophenyl)phenoxarsine and 10 - (p - chlorophenyl)phenoxarsine gives complete control and kill of the organisms *Candida pelliculosa, Trichophyton mentagrophytes* and acid fast bacterium when one of the named compounds is separately applied to the environments containing and supporting thriving members of one of such organisms at a concentration of 500 parts per million by weight.

In further representative operations, each of 10 - (o-chlorophenyl)phenoxarsine, 10 - (m - chlorophenyl)phenoxarsine and 10 - (p - chlorophenyl)phenoxarsine gives substantially complete control and kill of southern army worms when such are contacted with aqueous compositions containing the named compounds at a concentration of 500 parts per million by weight.

In additional operations, each of 10-(o-chlorophenyl) phenoxarsine, 10 - (m - chlorophenyl)phenoxarsine and 10 - (p - chlorophenyl)phenoxarsine gives substantially complete control and kill of pigweed when aqueous compositions containing the named compounds in amounts which provide rates of 10 pounds per acre are used in pre-emergence soil treatment.

In further additional operations, 10 - (p-chlorophenyl) phenoxarsine can be used as a stabilizer additive in polyvinyl chloride systems. The compound, when incorporated into the polyvinyl chloride, has been shown to impart outstanding performance characteristics such as remarkable heat and light stability, exceptional permanence and highly effective antifungal and antibacterial properties.

As indicated hereinbefore, the starting materials used in the synthesis of the 10-(halophenyl)phenoxarsine compounds of this invention are a halophenyl Grignard reagent and 10-chlorophenoxarsine. The former is prepared by refluxing magnesium and a bromochlorobenzene, bromoiodobenzene or chloroiodobenzene in tetrahydrofuran as represented by the following equation:

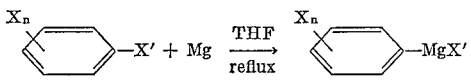

wherein X is chloro or bromo, $n$ is an integer ranging from 1 to 5, inclusive, and X' is bromo or iodo, with the further limitation that when X is bromo, X' is iodo. 10-chlorophenoxarsine is prepared by the neat reaction of diphenyl ether and arsenic trichloride in the presence of a catalytic amount of aluminum chloride. The synthesis is represented by the following equation:

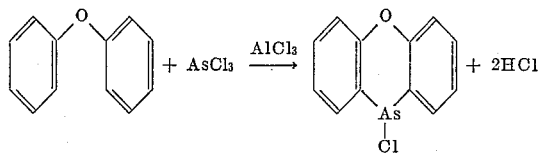

Various modifications can be made in the present invention without departing from the spirit or scope thereof for it is understood that we limit ourselves only as defined in the appended claims.

What is claimed is:
1. The compounds corresponding to the formula

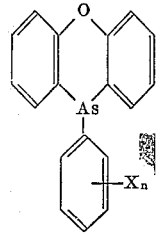

wherein X is chlorine or bromine and $n$ is an integer ranging from 1 to 5, inclusive.

2. The compound claimed in claim 1 wherein X is chlorine.

3. The compound claimed in claim 1 which is 10-(p-chlorophenyl)phenoxarsine.

4. The compound claimed in claim 1 which is 10-(o-chlorophenyl)phenoxarsine.

5. The compound claimed in claim 1 which is 10-(m-chlorophenyl)phenoxarsine.

References Cited
UNITED STATES PATENTS

| | | | |
|---|---|---|---|
| 2,767,114 | 10/1956 | Urbschat et al. | 260—440 |
| 3,036,107 | 5/1962 | Dunbar | 260—440 |
| 3,038,921 | 6/1962 | Strycker et al. | 260—440 |
| 3,149,133 | 9/1964 | Strycker | 260—440 X |
| 3,197,494 | 7/1965 | Strycker | 260—440 |
| 3,197,495 | 7/1965 | Strycker | 260—440 |

HELEN M. McCARTHY, Primary Examiner

W. F. W. BELLAMY, Assistant Examiner

U.S. Cl. X.R.

71—97; 260—45.75; 424—297